United States Patent [19]

Gain, Jr.

[11] 4,448,148

[45] May 15, 1984

[54] POST INDICATING VALVE ASSEMBLY INDICATOR

[75] Inventor: Lorand H. Gain, Jr., Montgomery, Ill.

[73] Assignee: Amsted Industries Incorporated, Chicago, Ill.

[21] Appl. No.: 373,876

[22] Filed: May 3, 1982

[51] Int. Cl.³ ............................................. F16K 37/00
[52] U.S. Cl. ...................................... 116/277; 137/556; 251/214
[58] Field of Search ................ 116/277; 137/553, 556; 251/214

[56] References Cited

U.S. PATENT DOCUMENTS

| | | | |
|---|---|---|---|
| 1,786,013 | 12/1930 | Haselton et al. | 116/277 X |
| 2,379,517 | 7/1945 | Hadden | 116/277 |
| 3,238,915 | 3/1966 | Smith et al. | 116/277 |
| 3,452,766 | 7/1969 | Fenster | 137/556 X |
| 3,804,056 | 4/1974 | Lee et al. | 116/277 |
| 4,297,966 | 11/1981 | Liberman | 137/553 X |

Primary Examiner—Daniel M. Yasich
Attorney, Agent, or Firm—Fred P. Kostka; Edward J. Brosius

[57] ABSTRACT

This invention relates to a valve having an improved valve position indicator so as to provide an accurate indication of the valve position from a distance. The improvement comprises the provision of indicators affixed to a member connected directly to the valve closure member so that the indicators may be positioned relative to viewing windows of an extension post of the valve to provide a corresponding open or closed valve position.

2 Claims, 5 Drawing Figures

U.S. Patent
May 15, 1984
4,448,148
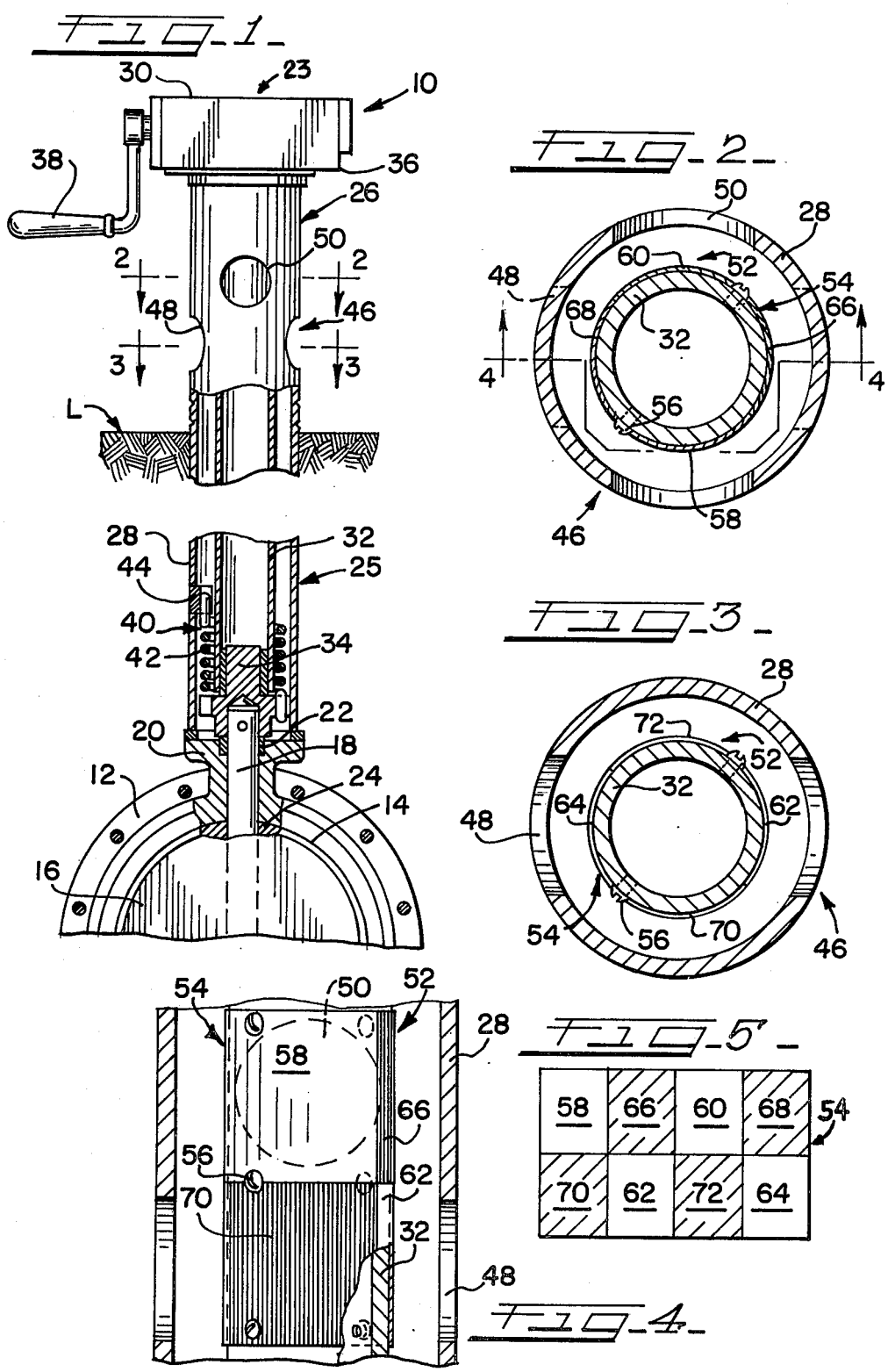

POST INDICATING VALVE ASSEMBLY INDICATOR

BACKGROUND OF THE INVENTION

This invention relates to a valve and more particularly to a valve position indicator that provides a remote visual indication of a valve in an open, closed or any position therebetween.

PRIOR ART

It is common practice to provide a valve position indicator on valves which are not readily accessible to direct viewing to determine the position thereof as for example valves which are buried underground.

Typical of such indicator devices is the structure shown and described in U.S. Patent 3,238,915 and 3,452,766. These devices include openings arranged to align with other openings. However, under certain weather and background conditions it is not always possible to ascertain whether the openings are aligned and thereby the position of the valve.

SUMMARY OF THE PRESENT INVENTION

By the present invention it is proposed to provide a valve position having color indicator structure which is viewable to determine both the open or closed positions of the valve from any location around the valve.

This is accomplished by the provision of two sets of diametrically opposed openings in an outer housing coaxially disposed about a shaft operatively connected to the valve and turnable between the open and closed positions. A different colored indicia is provided on the shaft and aligned with the respective sets of vertically spaced openings in the open and closed positions of the valve so that the valve position can be visually determined by the view from substantially any location around the valve.

DESCRIPTION OF THE DRAWINGS

In the drawings,

FIG. 1 is a partial elevational view of a valve assembly embodying the structure of the invention, a portion of the assembly is broken away to show underlying details of structure;

FIG. 2 is a plan sectional view taken along line 2-2 of FIG. 1;

FIG. 3 is a plan sectional view taken along line 3-3 of FIG. 1;

FIG. 4 is a partial elevational view taken along line 4-4 of FIG. 2 indicating the visually means relative to the viewing openings.

FIG. 5 is a view of the indicator means.

DESCRIPTION OF THE PREFERRED EMBODIMENT

Referring now to FIG. 1, there is shown a valve assembly 10 embodying the structure of the invention. The assembly 10 generally comprises a valve means 12 mounted in a pipeline for controlling the rate of fluid flowing therethrough. The pipeline may be part of a sprinkler system for providing water to a building. Ordinarily, the valve assembly 10 in such systems is installed outside of the building, oftentimes in a separate enclosure, so that in the event of fire, the sprinklers may be turned off after the fire is extinguished. The pipeline carrying the water into the building is generally below ground level L and is controlled by the valve means 12 which may be a butterfly valve.

Valve means 12 generally comprises a valve body 14 for the passage of water therethrough. A valve closure member 16 such as a circular lens shaped disc is mounted on the body for regulating the water flow rate. Disc 16 is constructed and arranged in body 14 so that when disc 16 is in sealing engagement with body 14 of valve means 12, the flow passage is closed, and when the face of disc 16 is rotated 90° to parallel the longitudinal axis of body 14, the valve is in a fully open position. Disc 16 may be disposed at any position between the open and closed positions by rotating a mounting shaft 18 fixedly secured thereto.

As shown in FIG. 1, the mounting shaft 18 is secured along the diametric axis of disc 16 whereby disc 16 may be rotated about shaft 18 for movement therewith. Shaft 18 extends beyond body 12 through a mounting bracket 20 of valve body 14 having sealing elements 22 and 24 such as gaskets, O-rings or the like to provide a fluid tight seal closure between shaft 18 and bracket 20 thereby to prevent fluid leakage from body 14.

A control mechanism 23 for opening and closing valve means 12 extends from underground valve means 12 upwardly and includes a riser or housing 25 having a portion 26 extending above grade. Riser 25 is of a hollow cylindrical shape having one end fixedly secured to mounting bracket 20 of valve means 12. An operator body 30 is fixed to the other end. An inner post 32 of a similar hollow cylindrical shape 28 is coaxially disposed within the riser 25. One end of inner post 32 is securely fastened to mounting shaft 18 through an adapter 34 so that inner post 32 is substantially coaxial with shaft 18 and to provide movement therewith. The opposite end of inner post 32 is operatively connected to a rotatable portion of operator 30 wherein the rotational movement from the operator is transmitted to operate the closing or opening of valve means 12 through its shaft 18.

Operator 30 as disclosed heretofore generally includes a body 36 having a crank handle 38 extending beyond body 36. Handle 38 is secured to a worm gear, screw (not shown) or the like disposed longitudinally in body 36. A follow gear or traveling nut (not shown) is in mesh with the worm gear or screw and operatively connected to linkages (not shown) and an output lug (not shown) so that a vertical rotation of crank handle 38 provides a horizontal rotation of the output lug and the connecting inner post 32. A worker can operate the handle manually or through an associated motor (not shown) to provide movement for the operator. For a more detailed description of the operator, reference is made to U.S. Pat. No. 3,452,766.

A safety device 40 of the valve assembly 10 is shown in FIG. 1 to provide automatic opening of valve means 12 in the event operator 30 or riser 26 is severed from the assembly. The device comprises a torsional spring 42 concentrically disposed between inner and outer posts 28 and 32. The torsional spring generally has two free ends. One free end of spring 42 is secured to a retainer block 44 provided on the wall portion of outer post 28 and the other free end of spring 42 is mounted to an arm of bracket 34 connected to shaft 18. The torsional spring is normally arranged to provide a rotating force on bracket 34 to open disc 16. It should be apparent that the rotational force to maintain disc 16 in an open position is much smaller than the closing force by the operator such that the operation of operator 30 is not interfered. In the event operator 30 is damaged or removed from post 26, or post 26 is severed, spring 42 provides a rotating force to move disc 16 in an open position in valve 12.

An indicator assembly 46 of the present invention is provided on the above grade portion 26 of riser 25 and below its connecting operator 30. The assembly 46 is constructed and arranged to provide an accurate and inexpensive indication of the valve position by having highly visible indicators associated with a closed or open position of the valve attached directly to riser 25 connecting to valve means 12. As a result, the indicators provide a true reading of the valve position independent of the accuracy of the operator.

Assembly 46 generally comprises a first pair of oppositely spaced viewing windows on openings 48 on the cylindrical wall portion of outer post 28. A second pair of oppositely spaced viewing windows or openings 50 are vertically spaced and each is disposed at 90° from the first pair of windows 48 so that the windows do not adversely affect the function of outer post 28 in providing structural support for the operator 30. The shape of the windows 48 and 50 may be formed by various configurations. As shown in FIG. 1, windows 46 and 48 are generally circular, and a line joining the centers of openings 50 is spaced vertically from a line joining the centers of windows 48 to provide adequate wall area between the openings to ensure structural support for operator 30. Windows 48 and 50 permit a worker to view the wall portion of the inner post 32 from practically any direction at a distance.

The cylindrical wall portion of inner post 32 having indicator means 52 affixed thereon and positioned relative to windows 48 and 50 so as to provide a corresponding open or closed valve position. As shown in FIGS. 2, 3 and 4, indicator means 52 comprises a collar 54 or other suitable structure enclosing the exterior wall portion of inner post 32. Collar 54 is properly secured to post 32 by fastening means 56 such as by an adhesive, screw or the like. It should be apparent that collar 54 may be decalcomania having an adhesive back face for securing onto post 32. The front face of the flexible material, as shown in FIG. 5, includes two rows and four columns of alternating indicia means 58, 60, 62, 64 and 66, 68, 70, 72, such that indicia means 58, 60, 62 and 64 provide a first indicia such as an identifiable color code, and indicia means 66, 68, 70 and 72 provide a second indicia such as a second identifiable color code.

Collar 54 is positioned around inner post 32 in a manner such that when valve means 12 is at a closed position, the first indicia means 58, 60, 62 and 64 on the wall portion of inner post 32 are in visual alignment with the two pairs of windows 48 and 50. This arrangement permits a worker to view through any of the windows from a distance and observe the first indicia means corresponding to a closed valve position.

When valve means 12 is turned from a closed position to an open position, inner post 32 will turn directly proportionally to the movement of the valve closure member 16. In a butterfly valve as shown in FIG. 1, closure member 16 rotates 90° from a closed to open position, its connecting inner post 32 and collar 54 is also rotated 90° to visually align the second indicia means 66, 68, 70 and 72 with the windows 48 and 50. The color used in the second indicia means will then be identified by the worker to indicate the valve is at an open position.

In order to enhance visibility of the indicia means in darkness, an optical reflecting tape having two colors may be used.

What is claimed is:

1. An indicator for a valve permitting observation of a valve position in the closed or open position thereof comprising a post connected for movement with a shaft for moving the valve between its open and closed position, a fixed housing coaxially disposed about said shaft, said housing including a first pair of diametrically opposed openings, and a second pair of diametrically opposed openings vertically spaced from said first pair of openings, color indicia means on said post fixed to said shaft and viewable through said openings, said indicia means when viewed through either of said openings in said first and second rows indicating simultaneously the closed or open position of said positions of said valve, wherein said indicia means includes a first row of two alternately arranged colors of which one color designates the open position and the other color the closed position of said valve, and a second row of the same two colors alternately arranged in staggered relation to said first row of colors, whereby the same colors are simultaneously visible through said openings in either the closed or open position of said valve.

2. The invention as defined in claim 1 wherein said indicia means comprises a metal band and said two rows of colors are formed thereon, and wherein means fasten said band to said shaft for movement therewith.

* * * * *